United States Patent [19]

Berke et al.

[11] Patent Number: 5,634,966

[45] Date of Patent: Jun. 3, 1997

[54] NITRITE-BASED CORROSION INHIBITORS WITH IMPROVED ANODIC AND CATHODIC INHIBITING PERFORMANCE

[75] Inventors: Neal S. Berke, Chelmsford; Maria C. Hicks, Newton, both of Mass.

[73] Assignee: W.R. Grace & Co.-Conn., New York, N.Y.

[21] Appl. No.: 504,089

[22] Filed: Jul. 19, 1995

[51] Int. Cl.$^6$ .......................... C04B 22/08; C04B 24/02; C09D 5/00

[52] U.S. Cl. .................. 106/14.41; 106/14.42; 106/644; 106/724; 106/727; 106/728; 106/808; 106/810; 106/823; 524/2; 524/5; 524/650; 526/262; 528/322

[58] Field of Search .................. 106/14.41, 802, 106/808, 823, 819, 643, 644, 810, 14.42, 724, 727, 728; 526/262; 528/322; 524/2, 5, 650

[56] References Cited

U.S. PATENT DOCUMENTS

| | | | |
|---|---|---|---|
| 3,427,175 | 2/1969 | Angstadt et al. | 106/713 |
| 4,092,109 | 5/1978 | Rosenberg et al. | 134/42 |
| 4,285,733 | 8/1981 | Rosenberg et al. | 106/640 |
| 4,466,834 | 8/1984 | Dodson et al. | 106/728 |
| 4,814,014 | 3/1989 | Arfaei | 106/724 |
| 4,946,904 | 8/1990 | Akimoto et al. | 525/327.8 |
| 5,211,751 | 5/1993 | Arfaei et al. | 106/823 |
| 5,340,385 | 8/1994 | Arfaei et al. | 106/823 |
| 5,348,583 | 9/1994 | Arfaei et al. | 106/823 |
| 5,362,323 | 11/1994 | Koyata et al. | 106/823 |
| 5,393,343 | 2/1995 | Darwin et al. | 106/808 |
| 5,422,141 | 6/1995 | Hoopes et al. | 106/14.41 |

*Primary Examiner*—Anthony Green
*Attorney, Agent, or Firm*—Craig K. Leon; William L. Baker

[57] ABSTRACT

Mixed anodic/cathodic corrosion inhibitors for use in hydraulic cement, comprising a) a first component consisting of an amount of alkali or alkaline earth metal nitrite sufficient to inhibit anodic corrosion; and b) a second component comprising an agent that acts to increases the anodic corrosion performance of the first component; wherein said first and second components are present in a weight ratio of from about 1:0.1 to 1:1. Optionally an EO/PO superplasticizer can be incorporated where the weight ratio of the first component, i.e., nitrite, to EO/PO superplasticizer is from about 1:0.005 to 1:0.25, with the surprising benefit of increased protection against cathodic corrosion without harming the level of anodic corrosion inhibition.

23 Claims, No Drawings

NITRITE-BASED CORROSION INHIBITORS WITH IMPROVED ANODIC AND CATHODIC INHIBITING PERFORMANCE

FIELD OF THE INVENTION

This invention relates to additives for cement compositions for the purpose of inhibiting corrosion, and to cement compositions containing such additives.

BACKGROUND OF THE INVENTION

Alkali and alkaline earth metal nitrites are well known as corrosion inhibiting hydraulic cement additives for protecting steel embedded in cement compositions. Calcium nitrite in particular is a well known anodic corrosion inhibitor and is widely used in concrete for preventing corrosion of the steel reinforcing. For example, U.S. Pat. No. 3,427,175 discloses the addition of about 0.1 to 10 percent calcium nitrite to Portland cement as an accelerator and as a corrosion inhibitor. Similarly, U.S. Pat. No. 4,466,834 discloses the addition to Portland cement of stable, single phase aqueous solutions consisting essentially of water and, as solutes, a major amount by weight of calcium nitrite and a minor amount by weight of corn syrup, a hydroxycarboxylic acid, or an alkali metal or alkaline earth metal salt of hydroxycarboxylic acid. The addition of such aqueous solutions to the cement provides the corrosion inhibition of calcium nitrite without the corresponding set acceleration.

While other nitrites such as sodium nitrite can be used to inhibit corrosion, calcium nitrite is preferred inasmuch as it provides effective corrosion inhibition without many of the disadvantages encountered with other nitrites, such as reduction in compressive strength or efflorescence on brick work.

Calcium nitrite anodic corrosion inhibitors rely on the formation of a passive film on the metal surface for corrosion protection. Cathodic inhibitors are another type of inhibitor which, in a high pH environment, inhibit the cathodic reaction which accompanies the anodic dissolution of the metal. In view of the specific properties that anodic and cathodic inhibitors each provide, it would be highly desirable to obtain both anodic and cathodic inhibition in cement compositions. However, this is not a simple proposition, as addition of some cathodic inhibitors actually reduces the anodic protection of calcium nitrite.

It is therefore an object of the present invention to combine the effects of anodic and cathodic corrosion inhibition in cement compositions to achieve the benefits of each.

SUMMARY OF THE INVENTION

The present invention relates to corrosion inhibitors for use in hydraulic cement, comprising a) a first component consisting of an amount of alkali or alkaline earth metal nitrite sufficient to inhibit anodic corrosion; and b) a second component comprising an agent that acts to increases the anodic corrosion performance of the first component; wherein said first and second components are present in a weight ratio of from about 1:0.1 to 1:1. An EO/PO superplasticizer can also be incorporated where the weight ratio of the first component, i.e., nitrite, to EO/PO superplasticizer is from about 1:0.005 to 1:0.25, with the surprising benefit of increased protection against cathodic corrosion without harming the level of anodic corrosion inhibition.

DETAILED DESCRIPTION OF THE INVENTION

The cement components in the cement compositions of the present invention are hydraulic cements. The term "hydraulic cements" is used herein in its ordinary and well accepted sense, and thus refers to any cement which, when made into a paste with water, sets and hardens as a result of chemical reactions between the water and the cement. Portland cement is the most familiar example of a hydraulic cement and is the preferred material for use in the cement compositions of the present invention. Other hydraulic cements include aluminous, oil well, slag, pozzolanic and silicate cements, as well as gypsum and magnesium oxychloride based materials, and mixtures thereof. These cements are well known in the art and are conventionally manufactured by calcining a mixture of limestone and clay to form a clinker, and then grinding the clinker to a fine powder. The cement compositions of the invention include concrete compositions comprising hydraulic cement, water, sand and coarse aggregate; cement pastes, comprising hydraulic cement and water, and mortars, comprising hydraulic cement, sand and water.

The amount of the first component of the corrosion inhibitor, i.e., alkali or alkaline earth metal nitrite, present in the cement compositions of the present invention will vary according to the requirements of the application, such as the corrosion resistance requirements. Generally, the amount of such nitrite is at least about 0.5% of the dry weight of cement in the composition, preferably from about 1.0% to about 5.0%, more preferably from about 2.0% to about 4.0%. The corresponding amount of admixture added to a cement composition to obtain the benefits of the invention will follow from these data. Mixtures of alkali or alkaline earth metal nitrites may be used.

The second component of the corrosion inhibitor comprises an agent that acts to increase the anodic corrosion performance of the first component, i.e., the level of chloride ion that a given amount of alkali or alkaline earth metal nitrite protects against is increased. The second component is advantageously an ether having the formula $R_1O(AO)_nH$ wherein A is a $C_2$–$C_4$ alkylene group or a combination of $C_2$–$C_4$ alkylene groups, n is 1–10, and $R_1$ is an alkyl or cycloalkyl group having 1 to 10 carbon atoms. $R_1$ may be, e.g., methyl, ethyl, propyl, isopropyl, n-butyl, isobutyl, tert-butyl, n-pentyl, isopentyl, cyclopentyl, and cyclohexyl. Examples of compounds conforming with the above formula are dipropylene glycol mono t-butyl ether and tripropylene glycol mono t-butyl ether.

Said second component may also comprise certain lower alkylene glycols represented by the formula HOBOH, wherein B is a $C_3$–$C_{10}$ alkylene group, preferably $C_5$–$C_8$ alkylene group. Examples of such lower alkylene glycols are 1,4-butanediol, 1,3-butanediol, 1,5-pentanediol, 1,4-pentanediol, 2-methyl-2,4 pentanediol; 4-methyl-2,4 pentanediol; and di t-butyl glycerin. Mixtures of the aforementioned second components may be used.

The second component is present in admixture with the alkali or alkaline earth metal nitrite component in a ratio of from about 1:0.1 to 1:1. We have found that while addition of the second component alone to cement actually decreases anodic corrosion resistance, addition of the second component in combination with alkali or alkaline earth metal nitrite surprisingly augments the performance of the nitrite, i.e., it increases the chloride level the nitrite protects against.

An EO/PO superplasticizer may be added as a third component of the admixture/cement composition. It has been surprisingly found that, in addition to the fluidifying properties imparted by these chemicals, the EO/PO superplasticizer further enhances the effectiveness of the nitrite, as well as itself providing cathodic protection. "EO/PO superplasticizer" is herein defined to mean any water-soluble polymeric compound that functions as a dispersant or hydraulic cement superplasticizer, and comprises a) polymeric backbone moiety and b) polymeric side chain moieties, wherein one of said a) and b) polymeric moieties is a polyether moiety, and the other is a non-polyether moiety formed by polymerization of ethylenically-unsaturated monomers. ("Water-soluble" means that the EO/PO superplasticizers should be soluble or dispersible in a 100% water medium, or a medium principally comprised of water, e.g., an aqueous alcohol medium containing a minor percentage of alcohol. The pH of the medium may be adjusted as necessary to cause or optimize polymer solubility.) The amount of EO/PO superplasticizer is such that the weight ratio of the first component, i.e., nitrite, to EO/PO superplasticizer is from about 1:0.005 to 1:0.25, advantageously 1:0.02 to 1:0.15, more advantageously 1:0.02 to 1:0.09.

As used herein, "polyether moiety" means any homopolymer or copolymer having repeating units linked by carbon-oxygen ether linkages, which is capable of having ethylenically-unsaturated monomer or polymer side chains attached to the backbone; alternately, such polyethers may be attached to a backbone formed by polymerization of ethylenically-unsaturated monomers. The polyether moiety thus has repeating units of the formula —(—O—R—)— wherein R is an organic moiety containing a carbon atom linked to the oxygen through a single covalent bond. The polyether moiety may contain two or more different repeating units with different R moieties.

When the polyether moiety is the backbone of the EO/PO superplasticizers, one or more of the repeating ether units may contain one or more carbon atoms which can function as side-chain attachment sites, e.g., by undergoing hydrogen or halogen abstraction. It is generally preferred that such side-chain attachment occur in the R moieties, although such sites may additionally or alternatively be provided by other groups or atoms which may be present in the polyether moiety.

R may be an arylene group, e.g., phenylene, provided that when the polyether moiety is the backbone of the polymer dispersant, other groups or moieties are present in the polymer which provide side-chain attachment sites; e.g., a divalent alkylaryl group wherein one of the alkyl carbon atoms is linked to the oxygen, e.g.,

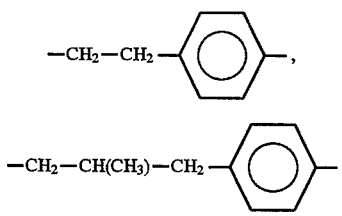

a saturated cyclic group, e.g., cyclohexylene; or a saturated or unsaturated, substituted or unsubstituted aliphatic group.

Saturated aliphatic groups are preferred R groups, particularly alkylene groups such as ethylene, propylene, butylene, isopropylene, or isobutylene. The preferred polyethers for use in the EO/PO superplasticizers (as either backbone or side chain polymer moieties) are accordingly polyoxyalkylene, e.g., polyoxyethylene homopolymers, polyoxypropylene homopolymers, and oxypropylene/oxyethylene copolymers. Polyoxyalkylenes are well known and a variety of such polymers are commercially available. Commercial polyoxyalkylenes which may be used in this invention include those sold under the PLURACOL, TETRONIC, and PLURONIC tradenames by BASF Wyandotte Corporation and under the JEFFAMINE and THANOL tradenames by Huntsman Chemical. The polyether moiety may include reactive groups, e.g., amino, carboxyl, or hydroxyl groups, positioned at the end of the polymer (when the polyether moiety is the backbone of the EO/PO superplasticizers) or at intermediate points along the polymer chain. When the polyether moiety is the backbone of the polymer dispersant, these groups may be derivatized before or after attachment of the side chains, if desired. Preferred polyoxyalkylene backbones, for example, include terminal hydroxyl groups arising from polymerization of the corresponding alkylene oxide. These hydroxyl groups may remain unreacted or may be derivatized before or after attaching the side chain(s) to provide, for example, urethane or ester derivatives.

A preferred number average molecular weight range, as determined by gel permeation chromatography, of the polyether backbone is preferably from about 200 to 30,000,and more preferably is in the range of about 500 to 10,000.

Where the backbone is a relatively hydrophobic polyether material, such that it has low water dispersibility or solubility, an appropriate non-polyether side chain moiety which imparts the desired solubility or dispersibility is attached to the polyether. Non-polyether side chain moieties used for this purpose should accordingly be more hydrophilic than the polyether backbone. Preferred non-polyether side chain moieties, from the standpoint of promoting water dispersibility and solubility, are those which contain salt-forming groups. The salt-forming groups may be provided by homopolymerizing or copolymerizing ethylenically unsaturated monomers containing an acid group, such as acrylic acid, methacrylic acid, or 2-sulfoethylmethacrylate, to form the side chain. Alternatively, monomers may be used which contain precursors which can be reacted after attachment to the polyether backbone to provide a salt-forming group, e.g., maleic anhydride may be incorporated into the side chain and subsequently hydrolyzed to the acid form. In general, after attachment the acid group is converted to its salt form by neutralization with a base. The salt-forming groups may also be provided by monomers containing a quaternary ammonium group or an amine group which can be quaternized after polymerization.

The ethylenically unsaturated monomers used in the EO/PO superplasticizers are polymerizable monomers characterized by the presence therein of at least one polymerizable ethylenic unsaturated group of the structure >C=C<. When the backbone of the EO/PO superplasticizers comprises a polyether moiety, such monomers which can be attached to the polyether to provide a EO/PO superplasticizers having a greater plasticizing capability than the polyether, and which permits water dispersibility or solubility of the EO/PO superplasticizers, can be used in this invention. The monomers can be used singly or in combination to produce homopolymer or copolymer side chains. Examples of ethylenically unsaturated monomers which can be used are the α,β-ethylenically unsaturated acids, e.g., acrylic acid, methacrylic acid, and itaconic acid; the α,β-ethylenically unsaturated acid esters, e.g., methyl acrylate, methylmethacrylate, ethylacrylate, 2-hydroxypropylacrylate, 2-hydroxypropylmethacrylate, 2-hydroxyethylmethacrylate, 2-hydroxyethylacrylate, 2-sulfoethylmethacrylate, 3-sulfopropylethacrylate, bis(3-sulfopropyl)itaconate, 2-phenoxyethlacrylate, tetrahydrofurfurylacrylate, cyclohexylmethacrylate, polyethylene glycol monomethacrylate, polypropylene glycol monoacrylate, and caprolactone acrylate monomers such as Tone M-100 monomer of Union Carbide Corp., the α,β-ethylenically unsaturated acid amides)e.g., acrylamide, methacrylamide, diacetone-acrylamide, dimethylaminopropylmethacrylamide, and 2-acrylamido-2-methylpropane sulfonic acid; ethylenically unsaturated acids and acid esters of the formula

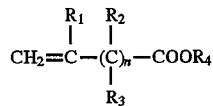

wherein $R_1$, $R_2$, $R_3$, and $R_4$ are each independently hydrogen or alkyl, and n is 1 to 20; vinyl esters such as vinyl acetate; vinyl ethers; vinyl ketones; vinyl aromatic monomers such as styrene and styrene sulfonic acid; N-vinylpyrrolidone; polymerizable acid anhydrides such as maleic anhydride and itaconic anhydride; aminoalkylacrylate and methacrylates, e.g., dimethylaminoethyl acrylate and diethylaminoethyl methacrylate; betaines such a N-(3-sulfopropyl)-N-methacryloxyethyl-N,N-dimethylammonium betaine; and cationic quaternary ammonium monomers such as the quaternized aminoalkyl acrylates and methacrylates. The α,β-ethylenically unsaturated acids are preferred monomers for use in this invention.

When the backbone of the EO/PO superplasticizers is a polyether moiety, it should be understood that, depending on the nature of the monomer, single monomeric units may become attached to the backbone. In particular, monomers conforming to the above formula (I) may attach in this manner. Accordingly, as used herein, the term "side chain" and "side chain polymer" broadly include and refer to attached moieties comprised of a single monomeric unit. Similarly, reference herein to the polymerization of ethylenically unsaturated monomers broadly includes the grafting of single monomeric units onto the polyether backbone.

Exemplary EO/PO superplasticizers comprising a polyether backbone which may be used are graft copolymer plasticizers like those described in U.S. Pat. No. 4,814,014, the disclosure of which is incorporated herein by reference. Such graft copolymer plasticizers comprise a polyether backbone polymer having an average molecular weight of about 200 to 30,000 and grafted side chain polymers prepared by polymerization of an ethylenically unsaturated monomer, wherein the graft copolymer plasticizer contains about 2% to 40% by weight of the side chain polymers.

When the EO/PO superplasticizers of the invention comprises a non-polyether moiety backbone, the backbone may be produced from the ethylenically-unsaturated monomers described hereinabove. The backbone may comprise a homopolymer or copolymer of said monomers. In certain preferred EO/PO superplasticizers comprising a non-polyether moiety backbone, i.e., as described in U.S. Pat. No. 4,946,904,the disclosure of which is incorporated herein by reference, the backbone is derived by copolymerization of a polyether, which is terminated at one end with a polymerizable ethylenically-unsaturated group, e.g., allyl or methacrylate, with a suitable comonomer. Particularly preferred comonomers are maleic acid, maleic anhydride, and acrylic acid. Furthermore, the same considerations applied to selecting the non-polyether moiety side chains pendent on a polyether moiety backbone (i.e., providing an EO/PO superplasticizer) having a greater plasticizing capability than the non-polyether backbone, and which permits water dispersibility or solubility of the EO/PO superplasticizers also apply when selecting the appropriate types and amounts of polyether moiety side chains to be attached to the non-polyether backbone.

The aforementioned EO/PO superplasticizers of U.S. Pat. No. 4,946,904, the disclosure of which is incorporated herein by reference, comprise a copolymer of an allyl-terminated polyoxyalkylene and maleic acid or anhydride. Preferred EO/PO superplasticizers of this type for use in the present invention are available under the name MALIALIM (Nippon Oil and Fats Co., Ltd.).

Other exemplary EO/PO superplasticizers are described in U.S. Pat. No. 5,393,343,and pending U.S. patent applications filed Jun. 21, 1995 the entire disclosures of which are incorporated herein by reference. The compounds of the aforementioned U.S. Pat. No. 5,393,343 are imidized acrylic polymers or copolymers thereof. The polymer can be represented by the general formula

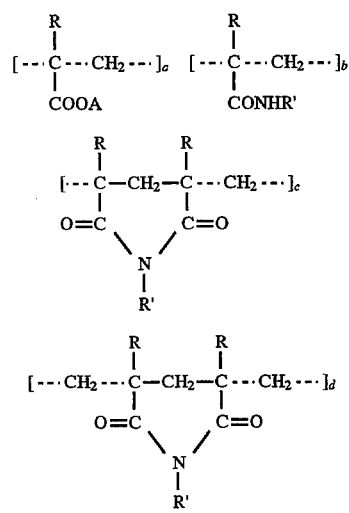

wherein each R independently represents a hydrogen atom or a methyl ($CH_3$—) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_nR''$ in which O represents an oxygen atom, B represents a $C_2$–$C_{10}$ alkylene group, R" represents a $C_1$–$C_{10}$ alkyl and n represents an integer of from 1–200, or mixtures thereof; and a, b, c and d are numerical values representing molar percentage of the polymer's structure such that a is a value of about 50 to 70; the sum of c+d is a value of from about 2 to the numerical value of (100–a); and b is a remainder value of [100–(a+c+d)].

It is generally advantageous to add the admixture components together in the form of a single additive, and as an aqueous solution. However, if desired, the components may be added to the composition separately. The cement composition may be in a dry powder form or mixed with water to form a plastic mix. It is preferred to add the additives of the invention to the cement in connection with preparation of an aqueous cement slurry, i.e., with the mix water or as additives to the already formed slurry composition.

Other components may be added to the compositions of the present invention in the manner and amounts well known to those skilled in the art, as long as such addition is not detrimental to the advantageous properties of our invention. Such components may include, for example, water reducing agents, air entraining agents, air detraining agents, pozzolanic materials and retarders.

The following examples are given for illustrative purposes only and are not meant to be of limiting effect. The term "DCI" (Grace Construction Products) used herein refers to a 30% (by weight) aqueous solution of calcium nitrite. The term "AA-1" refers to a 40% (by weight) aqueous solution of a graft copolymer made in accordance with U.S. Pat. No. 4,814,014. The term "PAJ" refers to an imidized copolymer made in accordance with Example 1 of U.S. Pat. No. 5,393,343. The term "Malialim" (Nippon Oils and Fats, Co., Inc., Japan) refers to polymers made in accordance with U.S. Pat. No. 4,946,904. The term "PPG" refers to a polypropylene glycol having a number average molecular weight of about 425.

The following examples are given for illustrative purposes only and are not meant to be a limitation on the claims appended hereto. All parts and percentages are by weight unless otherwise indicated.

EXAMPLE 1

Mortar "lollipops" (2"×4" specimens) with 3" No. 3 rebar embedded therein were prepared from mortar cylinders. A portion (1") of rebar is taped to prevent rebar contact with ambient air and surrounding mortar, and the remaining portion of rebar in direct contact with the mortar is left untaped (2"). The lollipop specimen is immersed in the calcium hydroxide solution for testing.

This test evaluates the detrimental or beneficial effect of admixtures to the anodic corrosion of rebars embedded in mortar. The samples are made with Type V cement and four sand gradations in the following proportions:

| Sand: | |
|---|---|
| FA 95 | 460 g |
| C 109 | 418 g |
| C 185 | 418 g |
| White 10 | 794 g |
| Cement: | 696 g |
| water/cement ratio ("W/C"): | 0.50 |

9 lb of Cl—(NaCl)/yd$^3$ cement were added to each mortar sample prepared (each sample was prepared in duplicate.) The exposed area of the rebar is 15 cm$^2$. The samples are cured for 3 days at 100% RH, immersed in a solution saturated with calcium hydroxide to within half an inch of the top surface for 24 hours, and kept at a potential of +100 mV vs. a saturated calomel electrode (SCE) for 24 hours. The resulting current is measured at regular intervals and the average current density is calculated at the end of the test.

The effectiveness of the admixtures is determined directly from the magnitude of the calculated average current density. When chloride is present the admixture is inhibiting (anodically) if the value of [1—(i/i Cl—)] is between 0.8 and 1 (where "i" is the average current density of the Cl— containing cement with admixture; and "i Cl$^-$"is the average current density of the cement containing only Cl—ion (i.e., no admixture)). It is preferred that the the value of [1—(i/i Cl—)] be as close to 1.0 as possible.

Data,obtained as above with various formulations of calcium nitrite are shown in Table 1. From these data, viz., admixtures 3 and 16, it can be seen that addition of an admixture of the invention comprising the three components of the admixture (nitrite, the nitrite performance-enhancing agent, and the EO/PO superplasticizer) provides much better protection against corrosion than admixtures comprising first and third components, or first and second components. Similar results are obtained with di t-butyl glycerin, as can be seen in Table 2, viz., admixture 4.

TABLE 1

Potentiostatic Tests
3 day cure, 1 day in lime water, + 100 mV v. SCE for 24 hours
Average current density (μA/cm$^2$)

| | 1 hr A | 24 hr B | C | D$^1$ | [1 − (i/i Cl$^-$)] E |
|---|---|---|---|---|---|
| 1  9 lb Cl$^-$/yd$^3$ cement (i.e., no admixture) | 22.4 9.5 | 51.2 85.9 | 42.7 51 | 46.9 | — |
| 2  3 lb/yd$^3$ DCI | 0.35 11 | 0.6 32 | 0.89 22 | 11.4 | 0.76 |
| 3  3 gal/yd$^3$ DCI + 4% AA-1 10% PPG + 10% glycerol | 0.77 0.51 | 0.17 0.07 | 0.32 0.19 | 0.3 | 0.99 |
| 4  3 gal/yd$^3$ DCI + 9% AA-1 | 0.56 0.9 | 0.1 0.24 | 0.21 0.39 | 0.3 | 0.99 |
| 5  3 gal/yd$^3$ DCI + 4% AA-1 | 1.1 4.8 | 6.3 46 | 25 31 | 28.0 | 0.40 |
| 6  3 gal/yd$^3$ DCI + 30% glycerol | 5.9 15 | 23 40 | 16 31 | 23.5 | 0.50 |
| 7  3 gal/yd$^3$ DCI + 5% glycerol | 8.5 0.4 | 69 21 | 43 6 | 24.5 | 0.48 |
| 8  3 gal/yd$^3$ DCI + 50% PPG | 18 6.5 | 24 157 | 27 117 | 72.0 | −0.54 |
| 9  3 gal/yd$^3$ DCI + 5% PPG | 28 37 | 47 60 | 51 46 | 48.5 | −0.04 |
| 10  3 gal/yd$^3$ DCI + 4% AA-1 5% PPG + 5% glycerol | 3.7 1.2 | 141 0.35 | 73 0.61 | 36.8 | 0.21 |

TABLE 1-continued

Potentiostatic Tests
3 day cure, 1 day in lime water, + 100 mV v. SCE for 24 hours
Average current density ($\mu A/cm^2$)

|  | 1 hr<br>A | 24 hr<br>B | C | $D^1$ | $[1 - (i/i\ Cl^-)]$<br>E |
|---|---|---|---|---|---|
| 11  3 gal/yd$^3$ DCI + 4% AA-1 | 0.3 | 140 | 62 | 73.5 | −0.57 |
|      50% PPG + 5% glycerol | 6.2 | 154 | 85 | | |
| 12  3 gal/yd$^3$ DCI + 4% AA-1 | 0.37 | 0.07 | 0.13 | 8.6 | 0.82 |
|      5% PPG + 30% glycerol | 11 | 14 | 17 | | |
| 13  3 gal/yd$^3$ DCI + 4% AA-1 | 0.5 | 28 | 19 | 11.3 | 0.76 |
|      50% PPG + 30% glycerol | 0.97 | 2.5 | 3.5 | | |
| 14  3 gal/yd$^3$ DCI + 9% AA-1 | 0.58 | 33 | 15.6 | 8.1 | 0.83 |
|      5% PPG + 5% glycerol | 1.6 | 0.33 | 0.58 | | |
| 15  3 gal/yd$^3$ DCI + 9% AA-1 | 1.7 | 19 | 26 | 14.1 | 0.70 |
|      50% PPG + 5% glycerol | 0.6 | 11 | 2.1 | | |
| 16  3 gal/yd$^3$ DCI + 9% AA-1 | 0.73 | 9.9 | 3.4 | 1.9 | 0.96 |
|      5% PPG + 30% glycerol | 0.77 | 0.19 | 0.36 | | |
| 17  3 gal/yd$^3$ DCI + 9% AA-1 | 0.81 | 4 | 5.8 | 5.3 | 0.89 |
|      50% PPG + 30% glycerol | 0.73 | 0.81 | 4.8 | | |
| 18  3 gal/yd$^3$ DCI + 6.5% AA-1 + | 0.8 | 10 | 3.4 | 14.2 | 0.70 |
|      27.5% PPG + 17.5% glycerol | 0.73 | 34 | 25 | | |

$^1$average of duplicate valueds from column C.
†In all tables, amounts of admixture components other than Ca(NO$_2$)$_2$ are weight percentages of component based on the weight of Ca(NO$_2$)$_2$ in the volume of DCI admixture added to the cement.

TABLE 2

Potentiostatic Tests
3 day cure, 1 day in saturated Ca(OH)$_2$, + 100 mV v. SCE for 24 hours
Average current density ($\mu A/cm^2$)

|  | 1 hr<br>A | 24 hr<br>B | C | D | $[1 - (i/i\ Cl^-)]$<br>E |
|---|---|---|---|---|---|
| 1  9 lb Cl$^-$/yd$^3$ cement | 22.4 | 51.2 | 42.7 | 46.9 | — |
|  | 9.5 | 85.9 | 51 | | |
| 2  9 lb/yd$^3$ Cl + 3 gal/yd$^3$ DCI | 0.35 | 0.6 | 0.89 | 11.4 | 0.76 |
|  | 11 | 32 | 22 | | |
| 3  9 lb/yd$^3$ Cl + 3 gal/yd$^3$ DCI + | 8.2 | 117 | 67 | 38.0 | 0.19 |
|     20% di t-butyl glycerin | 0.49 | 17 | 9 | | |
| 4  9 lb/yd$^3$ Cl + 3 gal/yd$^3$ DCI + | 0.68 | 2.5 | 1.7 | 0.9 | 0.98 |
|     20% di t-butyl glycerin + 6%<br>AA-1 | 0.39 | 0.08 | 0.14 | | |

EXAMPLE 2

Cyclic polarization tests were performed to evaluate the performance of corrosion inhibitors in conditions promoting pitting in environments that simulate those found in concrete pore water. The tests were carried out in saturated calcium hydroxide solutions containing chloride ions. A metal sample (steel cylinder 9 mm diameter and 13 mm long) was immersed in a saturated calcium hydroxide solution containing chloride ions and anodically polarized from −800 mV vs. SCE at a scan rate of 5 mV/s until the current reached 255 μA/cm$^2$ at which point the direction of the scan was reversed. The scan ended at −700 mV vs. SCE. The resulting current was measured throughout the scan.

The results are shown in Table 3. Two important data are tabulated:

$E_p$—pitting or protection potential:potential below which pitting cannot occur I—current density at −700 mV v. SCE In general, if an admixture-containing cement has a measured $E_p$ value about 200 mV higher than the $E_p$ value for a cement containing only Cl—, the admixture is deemed as providing acceptable anodic corrosion properties. Also, as $E_p$ approaches the $E_p$ value of a cement containing only Cl—, i.e., more negative, the less effective the anodic corrosion inhibitor. In other words, the more positive $E_p$ is, the better. The magnitude of the current density I at −700 mV v SCE gives a relative indication of the effectiveness of cathodic inhibition; this number should be as close to zero as possible, but for practical purposes should be as close as possible to the I value for the cement containing only Cl—.

The effect of dipropylene glycol mono t-butyl ether can be seen from the data in Table 3. Dipropylene glycol mono t-butyl ether by itself (admixtures 4, 5) is detrimental to anodic corrosion, as shown by the more negative values of $E_p$ relative to the reference admixture 2 containing only Ca(NO$_2$)$_2$. However, dipropylene glycol mono t-butyl ether in combination with Ca(NO$_2$)$_2$, viz., admixtures 6, 7 and 8, surprisingly provide both acceptable anodic and cathodic inhibition, as can be seen in the improvement in I and $E_p$ over admixtures 4 and 5. It can clearly further be seen that the combination of nitrite, the nitrite performance-enhancing agent, and the EO/PO superplasticizer viz., admixtures

TABLE 3

CYCLIC POLARIZATION DATA

| | $E_p$(mV vs. SCE) | I |
|---|---|---|
| 1  0.5 M NaCl | −481 | 34.0 |
| 2  0.5 M Ca(NO$_2$)$_2$ | −122 | 92.0 |
| 3  0.5 M Ca(NO$_2$)$_2$ + 3% PAJ | −119 | 45 |
| 4  33 g/L dipropylene glycol mono t-butyl ether | −479 | 77 |
| 5  66 g/L dipropylene glycol mono t-butyl ether | −592 | 54 |
| 6  0.5 M Ca(NO$_2$)$_2$ + 10% dipropylene glycol mono t-butyl ether (s/s Ca(NO$_2$)$_2$) | −218 | 73 |
| 7  0.5 M Ca(NO$_2$)$_2$ + 50% dipropylene glycol mono t-butyl ether (s/s Ca(NO$_2$)$_2$) | −136 | 92 |
| 8  0.5 M Ca(NO$_2$)$_2$ + 100% dipropylene glycol mono t-butyl ether (s/s Ca(NO$_2$)$_2$) | −130 | 72 |
| 9  0.5 M Ca(NO$_2$)$_2$ + 10% dipropylene glycol mono t-butyl ether (s/s Ca(NO$_2$)$_2$) + 4% AA-1 | −143 | 38 |
| 10  0.5 M Ca(NO$_2$)$_2$ + 50% dipropylene glycol mono t-butyl ether (s/s Ca(NO$_2$)$_2$) + 4% AA-1 | −156 | 72 |
| 11  0.5 M Ca(NO$_2$)$_2$ + 3% Malialim 0531 | −127 | 61 |
| 12  0.5 M Ca(NO$_2$)$_2$ + 3% Malialim 1511 | −182 | 49 |

9–12, provide even better cathodic inhibition and improved anodic inhibition over the calcium nitrite alone.

What is claimed is:

1. A corrosion-inhibiting admixture, which, when added to hydraulic cement, imparts enhanced anodic and cathodic corrosion inhibition, said admixture comprising:
   a) a first component consisting of an amount of alkali or alkaline earth metal nitrite effective to inhibit anodic corrosion;
   b) a second component comprising an agent operative to enhance said corrosion inhibition effectiveness of said first component, said second component comprising a material selected from the group consisting of an ether and an alkylene glycol, said ether having the formula $R_1O(AO)_nH$ wherein A is at least one $C_2$–$C_4$ alkylene group, n is 1–10, and $R_1$ is an alkyl or cycloalkyl group having 1 to 10 carbon atoms; and said alkylene glycol having the formula HOBOH, wherein B is a $C_3$–$C_{10}$ alkylene group; and said first and second components are present in a weight ratio of from about 1:0.1 to 1:1; and
   c) a third component consisting of an EO/PO superplasticizer in a weight ratio to said first component of from about 1:0.005 to 1:0.25, said superplasticizer comprising (i) a polymeric backbone moiety and (ii) polymeric side chain moieties, wherein one of said (i) and (ii) polymeric moieties is a polyether moiety and the other is a non-polyether moiety formed by polymerization of ethylenically-unsaturated monomers.

2. The admixture of claim 1 wherein said second component is selected from the group consisting of dipropylene glycol mono t-butyl ether; tripropylene glycol mono t-butyl ether; 1,4-butanediol; 1,3-butanediol; 1,5-pentanediol; 1,4-pentanediol; 2-methyl-2,4 pentanediol; 4-methyl-2,4 pentanediol; and di t-butyl glycerin.

3. The admixture of claim 1 wherein said EO/PO superplasticizer is a graft copolymer plasticizer, wherein said graft copolymer plasticizer comprises a polyether backbone polymer having an average molecular weight of about 200 to 30,000 and has side-chain polymers prepared by polymerization of an ethylenically-unsaturated monomer, said graft copolymer plasticizer containing about 2% to 40% by weight of said side-chain polymers.

4. The admixture of claim 1 wherein said EO/PO superplasticizer is a copolymer of an allyl-terminated polyoxyalkylene and a comonomer selected from the group consisting of maleic acid, maleic anhydride, and acrylic acid.

5. The admixture of claim 4 wherein said EO/PO superplasticizer comprises a copolymer of maleic anhydride and an allyl ether having the formula CH$_2$=CHCH$_2$O(C$_2$H$_4$O)$_9$CH$_3$ and having a number average molecular weight of from about 5,000 to 25,000.

6. The admixture of claim 1 wherein said EO/PO superplasticizer is an imidized acrylic polymer represented by the structure of:

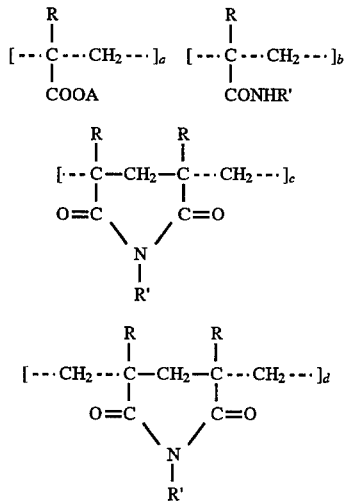

wherein each R independently represents a hydrogen atom or a methyl (CH$_3$—) group; A represents hydrogen atom, a C$_1$–C$_{10}$ alkyl group, R' or an alkali metal cation or a mixture thereof; R' represents a hydrogen atom or a C$_2$–C$_{10}$ oxyalkylene group represented by (BO)$_n$R" in which O represents an oxygen atom, B represents a C$_2$–C$_{10}$ alkylene group, R" represents a C$_1$–C$_{10}$ alkyl and n represents an integer of from 1–200, or mixtures thereof; and a, b, c and d are numerical values representing molar percentage of the polymer's structure such that a is a value of about 50 to 70; the sum of c+d is a value of from about 2 to the numerical value of (100−a); and b is a remainder value of [100−(a+c+d)].

7. The admixture of claim 1 wherein said second component is an alkylene glycol.

8. A hardened cement composition comprising embedded steel, hydraulic cement binder, and an admixture composition comprising:

a) a first component consisting of an amount of alkali or alkaline earth metal nitrite effective to inhibit anodic corrosion;

b) a second component comprising an agent operative to enhance said anodic corrosion inhibition effectiveness of said first component, said second component comprising a material selected from the group consisting of an ether and an alkylene glycol, said ether having the formula $R_1O(AO)_nH$ wherein A is at least one $C_2$–$C_4$ alkylene group, n is 1–10, and $R_1$ is an alkyl or cycloalkyl group having 1 to 10 carbon atoms; and said alkylene glycol having the formula HOBOH, wherein B is a $C_3$–$C_{10}$ alkylene group; and said first and second components are present in a weight ratio of from about 1:0.1 to 1:1; and c) an EO/PO superplasticizer in a weight ratio to said first component of from about 1:0.005 to 1:0.25, said superplasticizer comprising (i) a polymeric backbone moiety and (ii) polymeric side chain moieties, wherein one of said (i) and (ii) polymeric moieties is a polyether moiety and the other is a non-polyether moiety formed by polymerization of ethylenically-unsaturated monomers;

wherein said hardened cement composition has enhanced anodic and cathodic corrosion inhibition.

9. The cement composition of claim 8 wherein the amount of said nitrite is at least about 0.5% by dry weight of cement binder in the composition.

10. The cement composition of claim 8 wherein said second component is selected from the group consisting of dipropylene glycol mono t-butyl ether; tripropylene glycol mono t-butyl ether; 1,4-butanediol; 1,3-butanediol; 1,5-pentanediol; 1,4-pentanediol; 2-methyl-2,4 pentanediol; 4-methyl-2,4 pentanediol; and di t-butyl glycerin.

11. The cement composition of claim 8 wherein said EO/PO superplasticizer is a graft copolymer plasticizer, wherein said graft copolymer plasticizer comprises a polyether backbone polymer having an average molecular weight of about 200 to 30,000 and has side-chain polymers prepared by polymerization of an ethylenically-unsaturated monomer, said graft copolymer plasticizer containing about 2% to 40% by weight of said side-chain polymers.

12. The cement composition of claim 8 wherein said EO/PO superplasticizer is a copolymer of an allyl-terminated polyoxyalkylene and a comonomer selected from the group consisting of maleic acid, maleic anhydride, and acrylic acid.

13. The cement composition of claim 12 wherein said EO/PO superplasticizer comprises a copolymer of maleic anhydride and an allyl ether having the formula $CH_2=CHCH_2O(C_2H_4O)_9CH_3$ and having a number average molecular weight of from about 5,000 to 25,000.

14. The cement composition of claim 8 wherein said EO/PO superplasticizer is an imidized acrylic polymer represented by the structure of:

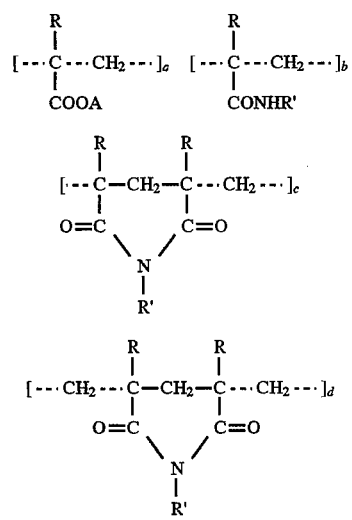

wherein each R independently represents a hydrogen atom or a methyl ($CH_{3-}$) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_nR''$ in which O represents an oxygen atom, B represents a $C_2$–$C_{10}$ alkylene group, R'' represents a $C_1$–$C_{10}$ alkyl and n represents an integer of from 1–200, or mixtures thereof; and a, b, c and d are numerical values representing molar percentage of the polymer's structure such that a is a value of about 50 to 70; the sum of c+d is a value of from about 2 to the numerical value of (100–a); and b is a remainder value of [100–(a+c+d)].

15. The cement composition of claim 8 wherein said second component is an alkylene glycol.

16. A method of producing a cement composition having enhanced anodic and cathodic corrosion resistance, comprising adding to a hydraulic cement binder a) a first component consisting of an amount of alkali or alkaline earth metal nitrite effective sufficient to inhibit anodic corrosion;

b) a second component comprising an agent operative to enhance said anodic corrosion inhibition effectiveness of the first component, said second component comprising a material selected from the group consisting of an ether and an alkylene glycol, said ether having the formula $R_1O(AO)_nH$ wherein A is at least one $C_2$–$C_4$ alkylene group, n is 1–10, and $R_1$ is an alkyl or cycloalkyl group having 1 to 10 carbon atoms; and said alkylene glycol having the formula HOBOH, wherein B is a $C_3$–$C_{10}$ alkylene group; and said first and second components are present in a weight ratio of from about 1:0.1 to 1:1; and c) an EO/PO superplasticizer in a weight ratio to said first component of from about 1:0.005 to 1:0.25, said superplasticizer comprising (i) a polymeric backbone moiety and (ii) polymeric side chain moieties, wherein one of said (i) and (ii) polymeric moieties is a polyether moiety and the other is a non-polyether moiety formed by polymerization of ethylenically-unsaturated monomers;

wherein enhanced anodic and cathodic corrosion resistance is imparted to said cement composition.

17. The method of claim 16 wherein the amount of said nitrite is at least about 0.5% by dry weight of cement binder in the composition.

18. The method of claim 16 wherein wherein said second component is selected from the group consisting of dipropylene glycol mono t-butyl ether; tripropylene glycol mono t-butyl ether; 1,4-butanediol; 1,3-butanediol; 1,5-pentanediol; 1,4-pentanediol; 2-methyl-2,4 pentanediol; 4-methyl-2,4 pentanediol; and di t-butyl glycerin.

19. The method of claim 16 wherein said EO/PO superplasticizer is a graft copolymer plasticizer, wherein said graft copolymer plasticizer comprises a polyether backbone polymer having an average molecular weight of about 200 to 30,000 and has side-chain polymers prepared by polymerization of an ethylenically-unsaturated monomer, said graft copolymer plasticizer containing about 2% to 40% by weight of said side-chain polymers.

20. The method of claim 16 wherein said EO/PO superplasticizer is a copolymer of an allyl-terminated polyoxyalkylene and a comonomer selected from the group consisting of maleic acid, maleic anhydride, and acrylic acid.

21. The method of claim 20 wherein said EO/PO superplasticizer comprises a copolymer of maleic anhydride and an allyl ether having the formula $CH_2=CHCH_2O(C_2H_4O)_9CH_3$ and having a number average molecular weight of from about 5,000 to 25,000.

22. The method of claim 16 wherein said second component is an alkylene glycol.

23. The method of claim 16 wherein said EO/PO superplasticizer is an imidized acrylic polymer represented by the structure of:

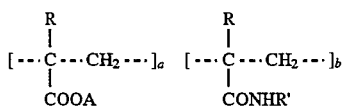

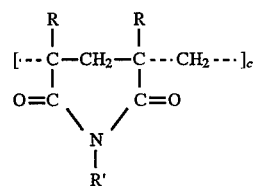

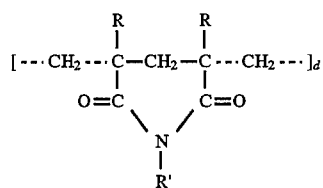

wherein each R independently represents a hydrogen atom or a methyl ($CH_3$—) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_nR''$ in which O represents an oxygen atom, B represents a $C_2$–$C_{10}$ alkylene group, R" represents a $C_1$–$C_{10}$ alkyl and n represents an integer of from 1–200, or mixtures thereof; and a, b, c and d are numerical values representing molar percentage of the polymer's structure such that a is a value of about 50 to 70; the sum of c+d is a value of from about 2 to the numerical value of (100–a); and b is a remainder value of [100–(a+c+d)].

* * * * *